US006728376B1

(12) United States Patent
Dean et al.

(10) Patent No.: US 6,728,376 B1
(45) Date of Patent: Apr. 27, 2004

(54) SYSTEM FOR ENCRYPTING DOCUMENTS WITH STENCILS

(75) Inventors: R. Drews Dean, Cupertino, CA (US); Matthew K. Franklin, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/470,876

(22) Filed: Dec. 22, 1999

(51) Int. Cl.[7] .................................................. G09C 5/00

(52) U.S. Cl. .......................................... 380/54; 283/17

(58) Field of Search ..................... 380/54, 243; 283/73, 283/17, 72; 399/84

(56) References Cited

U.S. PATENT DOCUMENTS

| | | | | |
|---|---|---|---|---|
| 4,088,073 A | * | 5/1978 | Crystal et al. | 101/128.4 |
| 4,682,954 A | * | 7/1987 | Cook | 380/54 |
| 4,776,013 A | * | 10/1988 | Kafri et al. | 380/54 |
| 4,896,355 A | * | 1/1990 | Iggulden et al. | 380/54 |
| 4,912,761 A | * | 3/1990 | Tan et al. | 380/243 |
| 4,916,739 A | * | 4/1990 | Iggulden et al. | 380/54 |
| 5,184,849 A | * | 2/1993 | Taylor | 283/67 |
| 5,321,749 A | * | 6/1994 | Virga | 380/243 |
| 5,488,664 A | | 1/1996 | Shamir | 380/54 |
| 5,541,993 A | * | 7/1996 | Fan et al. | 380/243 |

OTHER PUBLICATIONS

Bruce Schneier, Applied Cryptography, 1996, John Wiley & Sons, Second Edition, pp. 13–14.*

Naor, Moni et al. "Visual Cryptography," Proceedings of Advances in Crytology—Eurocrypt '94, Perugia, Italy, May 9–12, 1994, pp. 1–12.

Shamir, Adi. "Visual Cryptanalysis," Proceedings of Advances in Cryptology—Eurocrypt '98, Espoo, Finland, May 31–Jun. 4, pp. 201–210.

* cited by examiner

Primary Examiner—Matthew Smithers
Assistant Examiner—Andrew Nalven
(74) Attorney, Agent, or Firm—Thomas B. Zell (57) ABSTRACT

A symmetric key encryption system includes a printer or copier for performing decryption in two passes. During a first pass an encrypted image is decrypted to define a first partially decrypted image and during a second pass a complement of the encrypted image is decrypted to define a second partially decrypted image. The first partially decrypted image is formed when the encrypted image is rendered onto a first recording medium through a stencil. The stencil, which is a random arrangement of holes, is overlaid on the first recording medium to permit only selected portions of the encrypted image to be rendered on the recording medium. During the second pass, the complement of the encrypted image is rendered on a second recording medium through a complement of the stencil to yield the second partially decrypted image. Overlaying and aligning the first partially decrypted image and the second partially decrypted image finally decrypts the encrypted image.

14 Claims, 6 Drawing Sheets

SYSTEM FOR ENCRYPTING DOCUMENTS WITH STENCILS

BACKGROUND OF THE INVENTION

1. Field of the Invention

The present invention relates generally to the encryption of document content, and more particularly, to a method and apparatus for encrypting document content using one-time stencils.

2. Description of Related Art

Cryptography, which includes encryption and decryption, involves the disguising of messages so that only certain people can see through the disguise. Generally, encryption systems perform an encryption operation on a plaintext (i.e., cleartext) message using an encryption key to produce a ciphertext message. The receiver of a ciphertext message performs a corresponding decryption operation with a decryption system using a decryption key to recover the plaintext block. Encryption systems fall into two general categories: symmetric and asymmetric. In the literature symmetric encryption systems are often called secret key systems, and asymmetric encryption key systems are often called public key systems. Symmetric encryption systems use the same secret key (i.e., private key) for both encrypting and decrypting a message, while asymmetric systems use a secret key to decrypt and a public key to encrypt a message.

One example of a symmetric cryptosystem is the Data Encryption Standard (DES) system. In the DES system, an encryption key, which has 56 independently specifiable bits, is used to convert a 64-bit plaintext blocks to ciphertext blocks, or vice versa. Another example of a symmetric cryptosystem is a Boolean one-time pad. The encryption key of a one-time pad is a random string that is the same length as the plaintext input string. Combining the encryption key using bitwise exclusive-OR with the plaintext produces the ciphertext output message. The advantage of one-time pads is that there does not exist a single nontrivial attack when the encryption key is generated completely at random. That is, if the entire encryption key of a one-time pad is random, an attacker with infinite computational resources can only guess the plaintext after seeing the ciphertext.

The operations of such cryptosystems need not be carried out electronically using traditional computational devices such as computers. Alternatively, operations of such cryptosystems can be performed visually, chemically, or by other non-traditional means. For example, U.S. Pat. No. 5,488,664 to Shamir discloses an encryption method that recovers cleartext by stacking one transparency with the encryption key printed on it and another transparency with the cypertext printed on it. This encryption method is a low fidelity one-pass method that is suitable for digital watermarking or the like. In addition, Shamir discloses in Visual Cryptanalysis", published at Advances in Cryptology, Eurocrypt. '98, Springer-Verlag, Berlin, 1998, a high fidelity two-pass method for carrying out parallel computations using photographic films to store the internal state of a bit-sliced computation, and contact printing to perform computational steps of, for example, an exclusive-OR operation.

One advantage of non-traditional cryptographic systems is that they enable cryptographic operations without requiring hardware such as a computer for performing decryption operations. That is, while one party may likely have a computer readily available for performing encryption, the other party decrypting the message may not. Consequently, there continues to be a need to provide non-traditional computational means for decrypting encrypted messages. It would therefore be advantageous to provide a one-time pad encryption system that permits decryption using a conventional printer or copier.

SUMMARY OF THE INVENTION

In accordance with the invention, there is provided a method for decrypting original image content in two passes. During a first pass, an encrypted image of the original image content is printed through a stencil to produce a first recording medium with a first partially decrypted image. The stencil blocks portions of the encrypted image from appearing on the first recording medium. During a second pass, a complement of the encrypted image is printed through a complement of the stencil to produce a second recording medium with a second partially decrypted image. The complement of the stencil selectively blocks portions of the complement of the encrypted image from appearing on the second recording medium. The first recording medium is overlaid with the first partially decrypted image on the second recording medium with the second partially decrypted image to fully decrypt the original image content. Alternatively, the original image is fully decrypted by printing the complement of the encrypted image through a complement of the stencil directly onto the first recording medium.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

Figure 1:
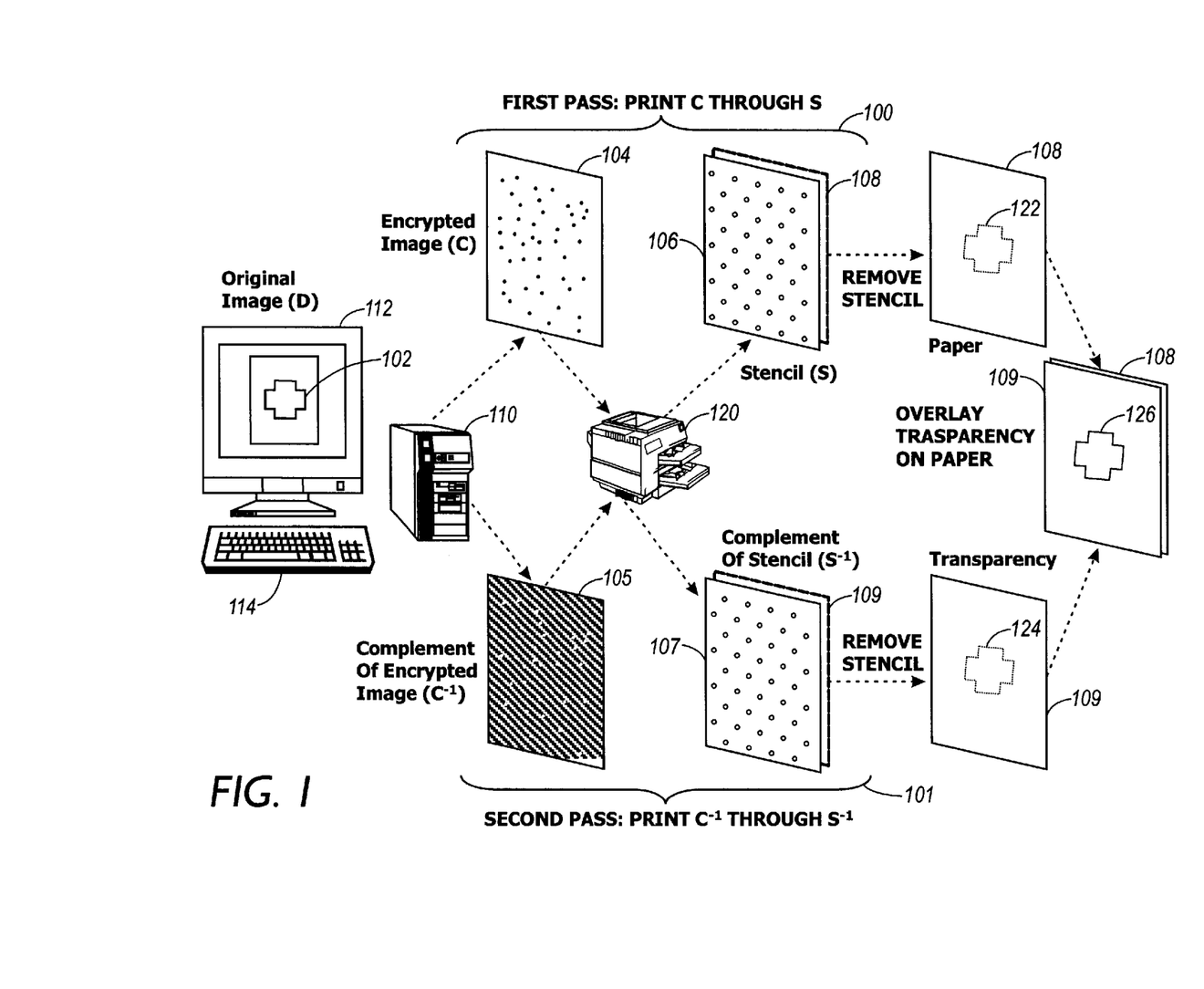
FIG. 1 illustrates a symmetric key cryptographic scheme that is performed in accordance with the present invention.

FIG. 1 illustrates a cryptographic scheme that is performed in accordance with the present invention. In one embodiment, an original image 102 is an electronic image that is created using, for example, a general-purpose computer 110, which includes a display 112 and a keyboard 114. The original image 102 (i.e., plain text) is encrypted using an encryption key 106 to define encrypted image 104. In one embodiment, the encryption key is a symmetric key such as a one-time pad.

By way of overview, the encrypted image 104 is partially decrypted in two passes using a printer 120. During a first pass 100, the printer 120 prints the encrypted image 104 through stencil 106 onto a first recording medium 108. During a second pass 101, the printer 120 prints a complement of the encrypted image 105 through a complement of the stencil 107 onto a second recording medium 109, which is transparent. To finally decrypt the encrypted image 104, the second recording medium with partially decrypted image 124 is overlaid on top of the first recording medium with partially decrypted image 122 to define fully decrypted image 126.

Figure 2:
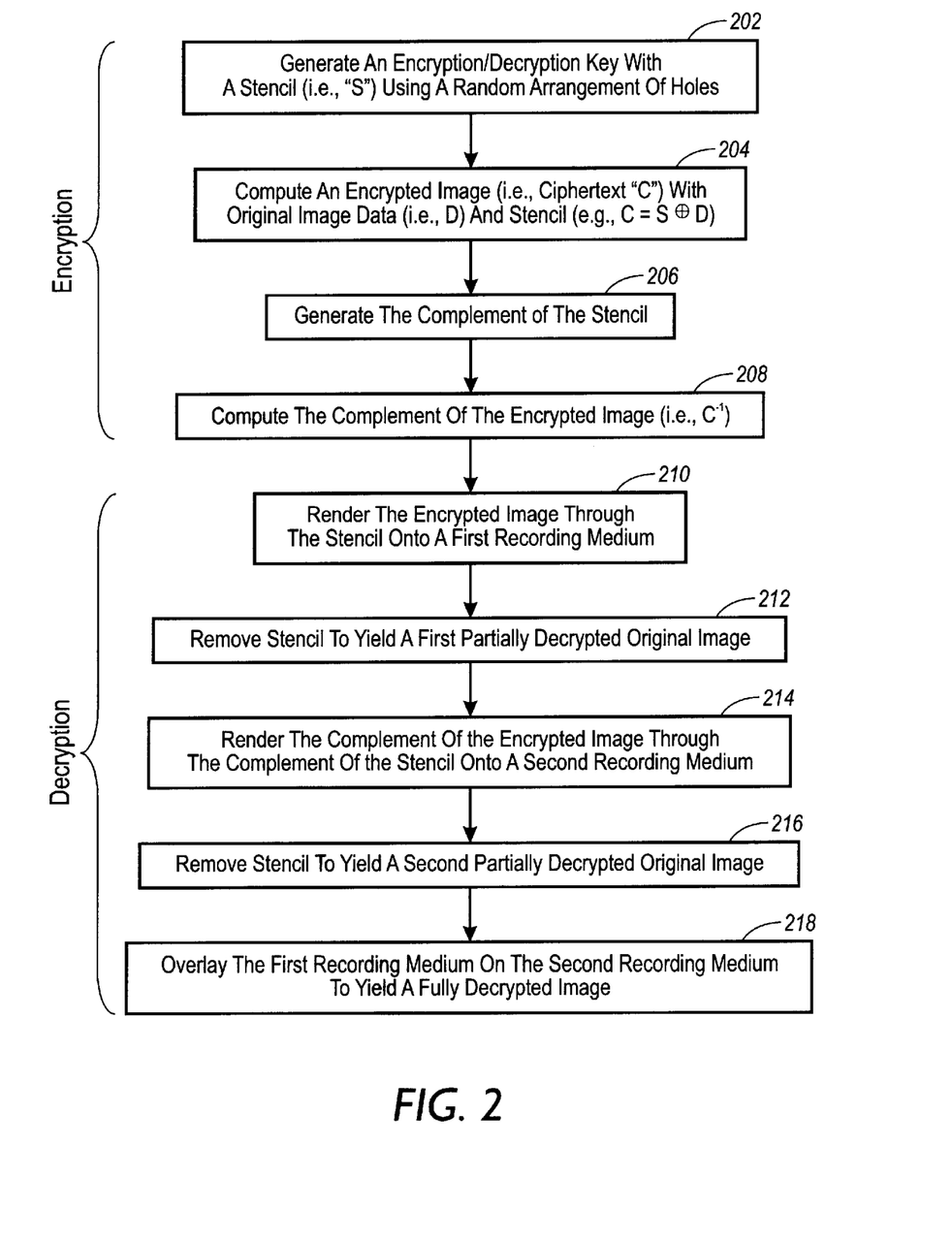
FIG. 2 sets forth a flow diagram of the steps for performing the cryptographic scheme illustrated in FIG. 1.

More specifically, FIG. 2 sets forth a flow diagram of the steps for performing the cryptographic scheme illustrated in FIG. 1. Generally, the steps 202, 204, 206, and 208 shown in FIG. 2 are performed to encrypt the original image 102, and the steps 210, 212, 214, 216, and 218 are performed to decrypt of the encrypted image 104 using the encryption key 106. However, it will be appreciated by those skilled in the art that the steps 206 and 208 could alternatively be performed during decryption of the encrypted image 104, and steps 210 and 212 could alternatively be performed during encryption of the original image 102.

Figure 4:
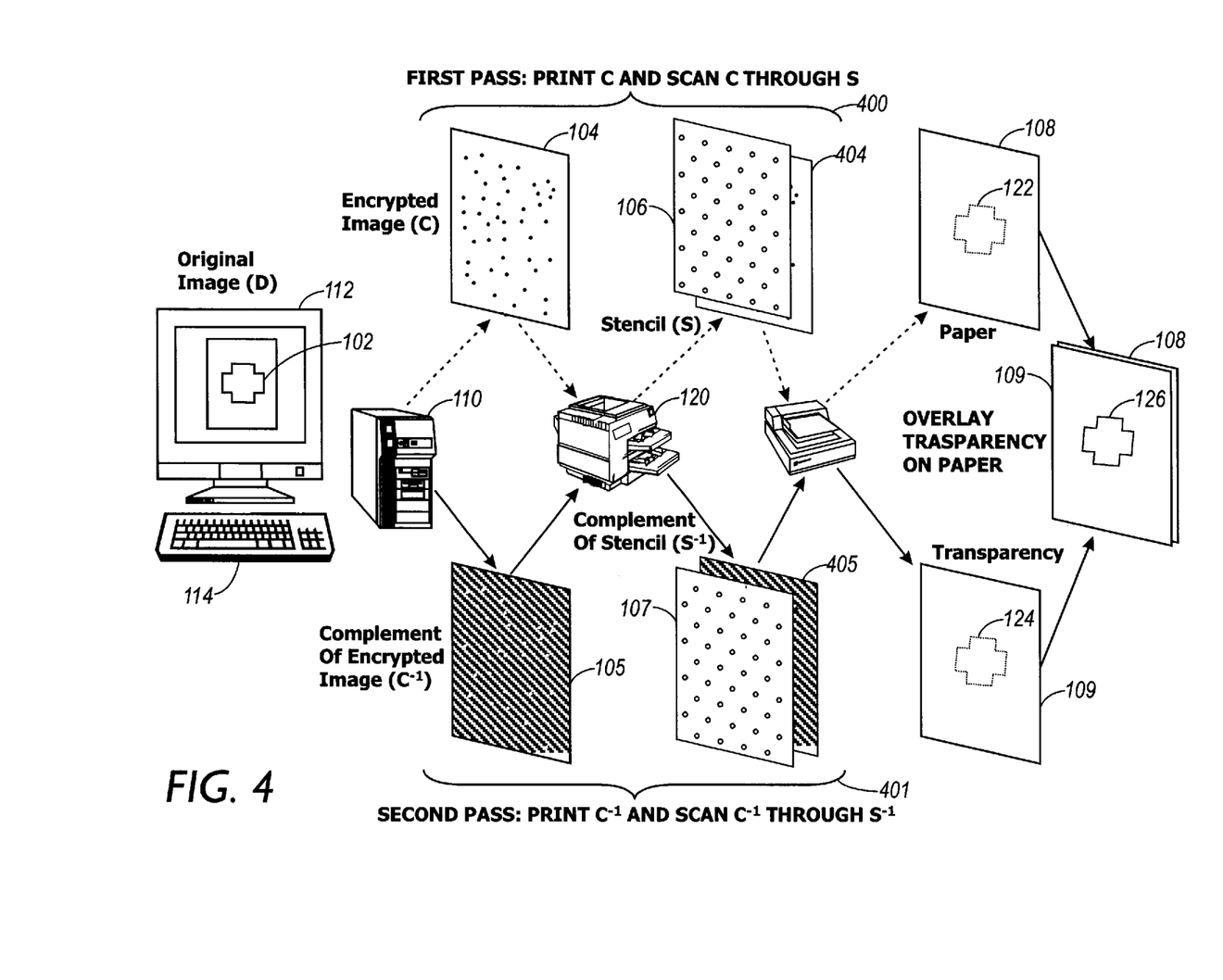
FIG. 4 illustrates an alternate embodiment of the present invention where the encrypted image and the complement of the encrypted image are printed on a third and a fourth recording medium that are subsequently scanned through the stencil and the complement of the stencil, respectively.

In operation, a first party (i.e., the encrypting party) may transmit or deliver an encrypted message to a second party (i.e., the decrypting party) using either an electronic medium or a physical medium such as paper or transparencies. In the embodiment shown in FIG. 1, the decrypting party is provided at a first point in time with the encryption key 106 that is in the form of a stencil. Subsequently at a second point in time, the encrypting party delivers the encrypted image 104 in electronic form to the decrypting party. In the embodiment that is shown in FIG. 4 and discussed in detail below, the encrypting party may deliver to the decrypting party a hardcopy document 404 with the encrypted image 104 rendered thereon.

Before computing the encrypted image 104, stencil or encryption/decryption key 106 is defined at step 202. In one embodiment, the stencil 106 is a hardcopy document with an image key defined by a random arrangement of perforated holes (i.e., a one-time pad) that is the same length (i.e., size and resolution) as the original image 102. Attacks on one-time pads are difficult because no information about the original image 102 can be derived from the encrypted image 104. In alternate embodiments that may be more susceptible to attacks, the encryption key is defined by an arrangement of holes that is strongly or weakly pseudorandom instead of truly random. In addition, it will be appreciated by those skilled in the art that a stencil or encryption key can be reused with the deleterious effect of increasing the likelihood of a successful attack.

It will be appreciated by those skilled in the art that there exist a number of ways to produce random stencils. In one embodiment, the random arrangement of perforated holes is computed from a short shared random seed using a pseudorandom generator and communicated to the encrypting and/or decrypting parties over a secure channel. The short random seed could be chosen by either the encrypting party, the decrypting party, mutually by the encrypting and decrypting parties, or independently by a third party (e.g., a printer). In the case of a third party, the stencil or seed could derived at an appropriate time from part of a hardcopy document itself, for example from glyph encoded information printed thereon or from random threads embedded therein.

At step 204, the encrypted image 104 is computed. With a one-time pad, performing a bitwise exclusive-OR operation with the original image 102 and the encryption key 106 produces the encrypted image 104. More specifically, let "S" be a two-dimensional binary representation of the image key defining the stencil 106, where a "0" (i.e., zero) indicates a hole and "1" (i.e., one) indicates a non-hole in the stencil 106. In addition, let "D" be a two-dimensional representation of the original "document" image 102, where a "0" indicates a white pixel and a "1" indicates a black pixel in the original image 102. The corresponding encrypted image 104 (i.e., "C" for ciphertext) computed at step 204 can be defined by the equation $C = D \oplus S$, where the symbol $\oplus$ signifies a bitwise exclusive-OR operation between D and S.

In accordance the invention, the cryptographic scheme includes a two-pass decryption operation. During the first pass 100, the encrypted image 104 is partially decrypted using the stencil 106. During the second pass 101, a complement of the encrypted image 105 (i.e., $C^{-1}$), which is computed at step 208, is decrypted using a complement of the stencil 107 (i.e., $S^{-1}$), which is computed at step 206. The complement of an encrypted image has flipped black and white pixels, and the complement of the stencil has flipped holes and non-holes. During each pass of the printer, image data is rendered on a recording medium (e.g., paper, transparency) only when the image data lines up with a hole in a stencil.

Figure 3:
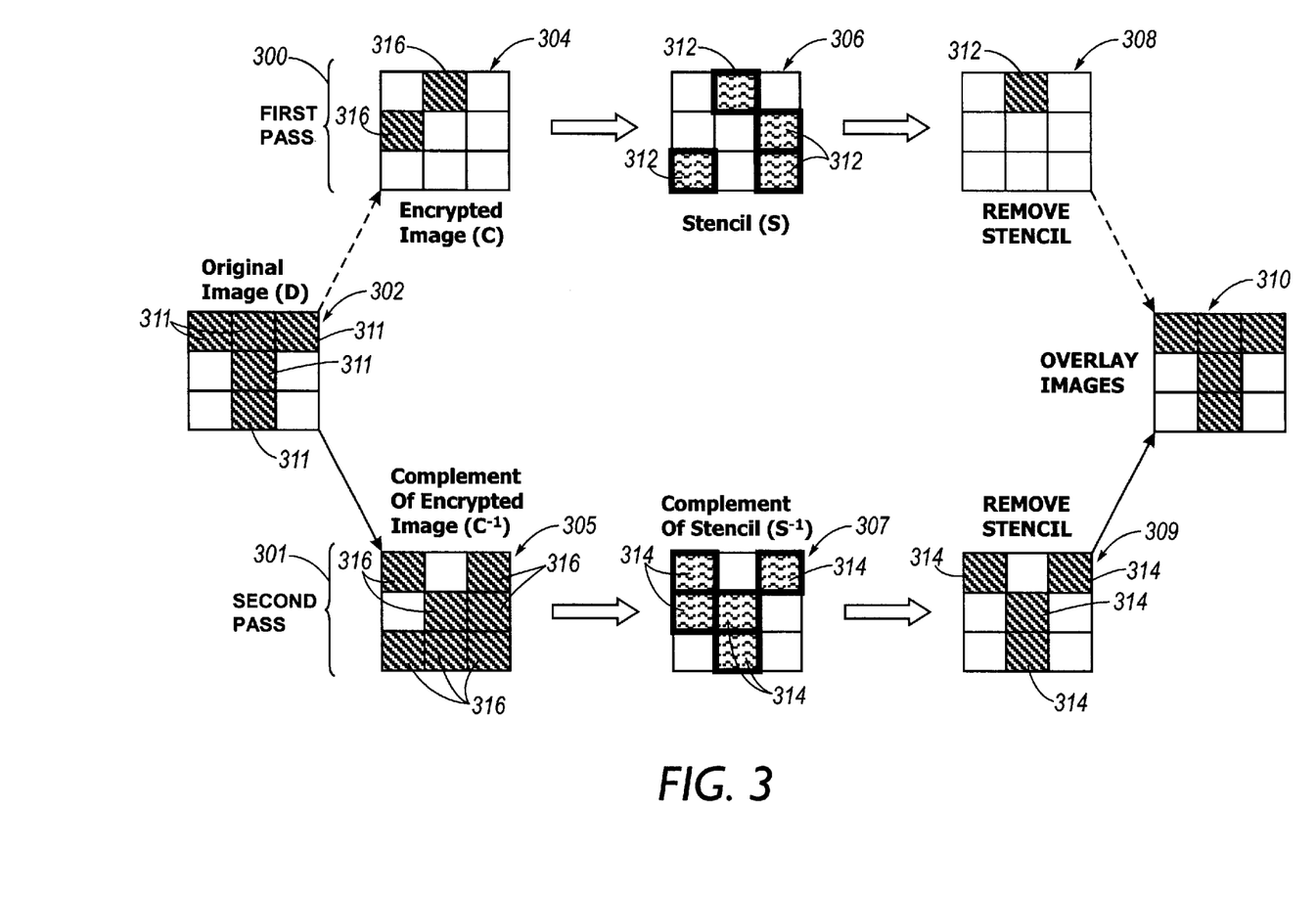
FIG. 3 illustrates an example of the two-pass decryption operation for performing the present invention.

FIG. 3 illustrates an example of the two-pass decryption operation for performing the present invention. In the example shown in FIG. 3, an original image 302 (i.e., D) is defined as having nine pixels with five black pixels 311. A stencil 306 (i.e., S) is generated (at step 202) with a random number of perforated holes 312. In addition, a complement of the stencil 307 (i.e., $S^{-1}$) is generated (at step 206) with the perforated holes 314. The two pass decryption operation that yields decrypted original image 310 (i.e., D) that is described in more detail below can be defined by the equation $D = C \oplus S$, which is a bitwise exclusive-OR of the encrypted image 304 (i.e., C) with the stencil 306 (i.e., S). The exclusive-OR of the encrypted image 304 (i.e., C) and the stencil 306 (i.e., S) to produce the original image 310 (i.e., D) can be represented using a matrix representation as follows:

$$C \oplus S = \begin{pmatrix} 0 & 1 & 0 \\ 1 & 0 & 0 \\ 0 & 0 & 0 \end{pmatrix} \oplus \begin{pmatrix} 1 & 0 & 1 \\ 1 & 1 & 0 \\ 0 & 1 & 0 \end{pmatrix} = \begin{pmatrix} 1 & 1 & 1 \\ 0 & 1 & 0 \\ 0 & 1 & 0 \end{pmatrix} = D.$$

Referring again to FIGS. 1 and 2, the encrypted image 104 is rendered through stencil 106 onto a first recording medium 108 at step 210 during a first pass 100 of printer 120. Subsequently at step 212, the stencil 106 is separated from the first recording medium 108 to reveal a first partially decrypted image 122 on the first recording medium 108. During a second pass 101 of the printer 102 at step 214, the complement of the encrypted image 105 is rendered through the complement of the stencil 107 onto the second recording medium (i.e., transparency) 109. Subsequently at step 216, the complement of the stencil 107 is separated from the transparency 109 to reveal a second partially decrypted image 124. To finally decrypt the original image 102 at step 218, the transparency is overlaid and aligned with the first recording medium 108 to yield decrypted original image 126.

Referring again to the example shown in FIG. 3, the encrypted image 304, which has black pixels 316, is rendered by the printer 120 during a first pass 300 through stencil 306 (at step 210) to produce a first partially decrypted image 308. Subsequently during a second pass 301, the complement of the encrypted image 305, which has black pixels 317, is rendered through the complement of the stencil 307 to produce a second partially decrypted image 309. Finally, the images 308 and 309 are overlaid and aligned through visual inspection to yield a decrypted original image 310 (at step 218).

Advantageously, a document that is sent to the printer 120 in encrypted form can be decrypted as it is being printed. A decryption "computation" is performed when the stencil 106 blocks or inhibits portions of the encrypted image 104 from being rendered on a recording medium. Those portions of the encrypted image 104 that are aligned with the holes of the stencil 106 are rendered on the first recording medium 108. In one embodiment, the stencil 106 is aligned with the first recording medium 108 (and the complement of the stencil 107 is aligned with the second recording medium 109 that is transparent) and fixedly attached or positioned in place before being inserted in the paper tray of the printer 120.

FIG. 4 illustrates an alternate embodiment of the present invention. During a first pass 400 in this embodiment, the encrypted image 104 is printed on a third recording medium 404 using printer 120. Subsequently, the encrypted image 104 on the third recording medium 404 is scanned through stencil 106 and printed on the first recording medium 108 using copier 402 to form the first partially decrypted image 122. During a second pass 401, the complement of the encrypted image 105, which is printed on a fourth recording medium 405, is scanned through the complement of the stencil 107 to record the second partially decrypted image 124 that is printed on the second recording medium 109. The decrypted original image 126 is then formed by overlapping the second recording medium 109, which is transparent, on the first recording medium 108.

Figure 5:
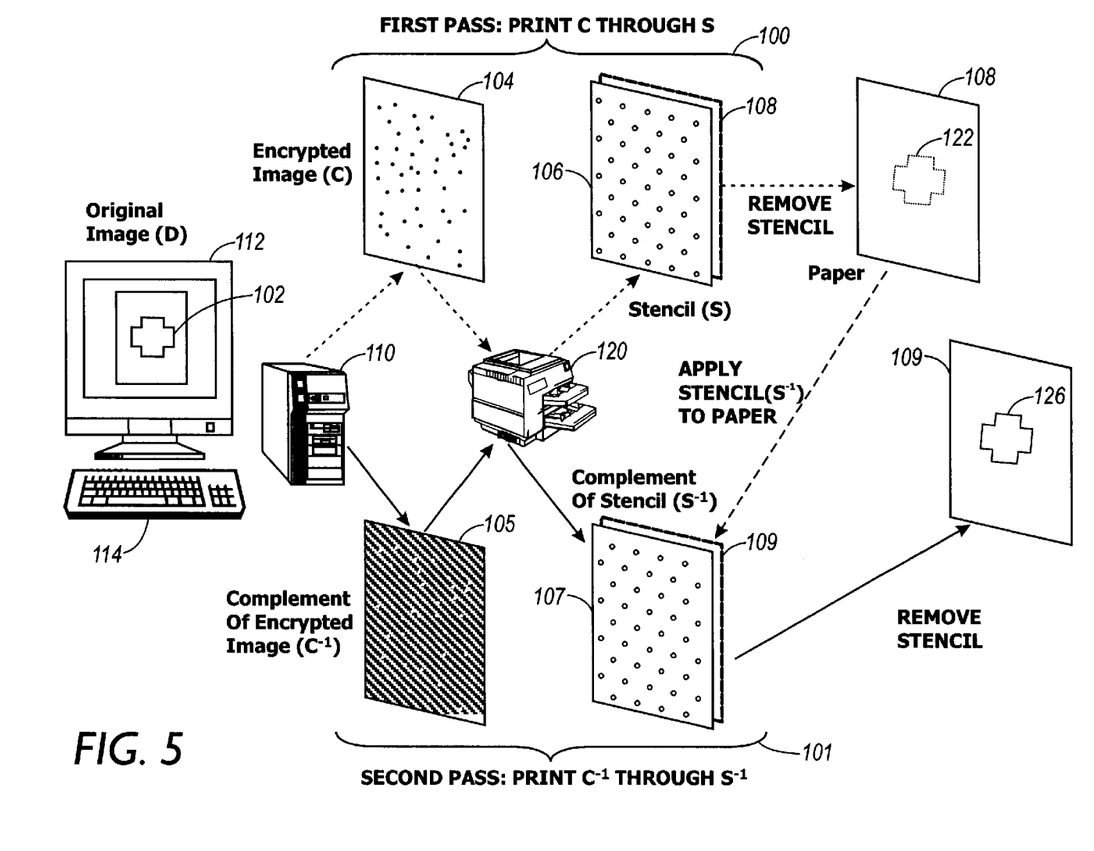
FIG. 5 illustrates another alternate embodiment of the present invention where the complement of a stencil is overlaid on a recording medium after a partially decrypted image is rendered thereon.

FIG. 5 illustrates another alternate embodiment of the present invention. In this embodiment of the invention, the complement of the stencil 107 is overlaid on the first recording medium 108 after the partially decrypted image 122 is rendered thereon (at step 212 ). Subsequently, the complement of the encrypted image 105 is rendered through the complement of the stencil 107 (at step 214 ) onto the first recording medium 108 to form the decrypted original image 126 thereon. In other words, in this embodiment, during a first pass the printer 120 renders on the first recording medium 108 the encrypted image 104 through the stencil 106 similar to the embodiment shown in FIG. 1. However, during the second pass the printer renders on the first recording medium 108 the complement of the encrypted image 105 through the complement of the stencil 107.

Figure 6:
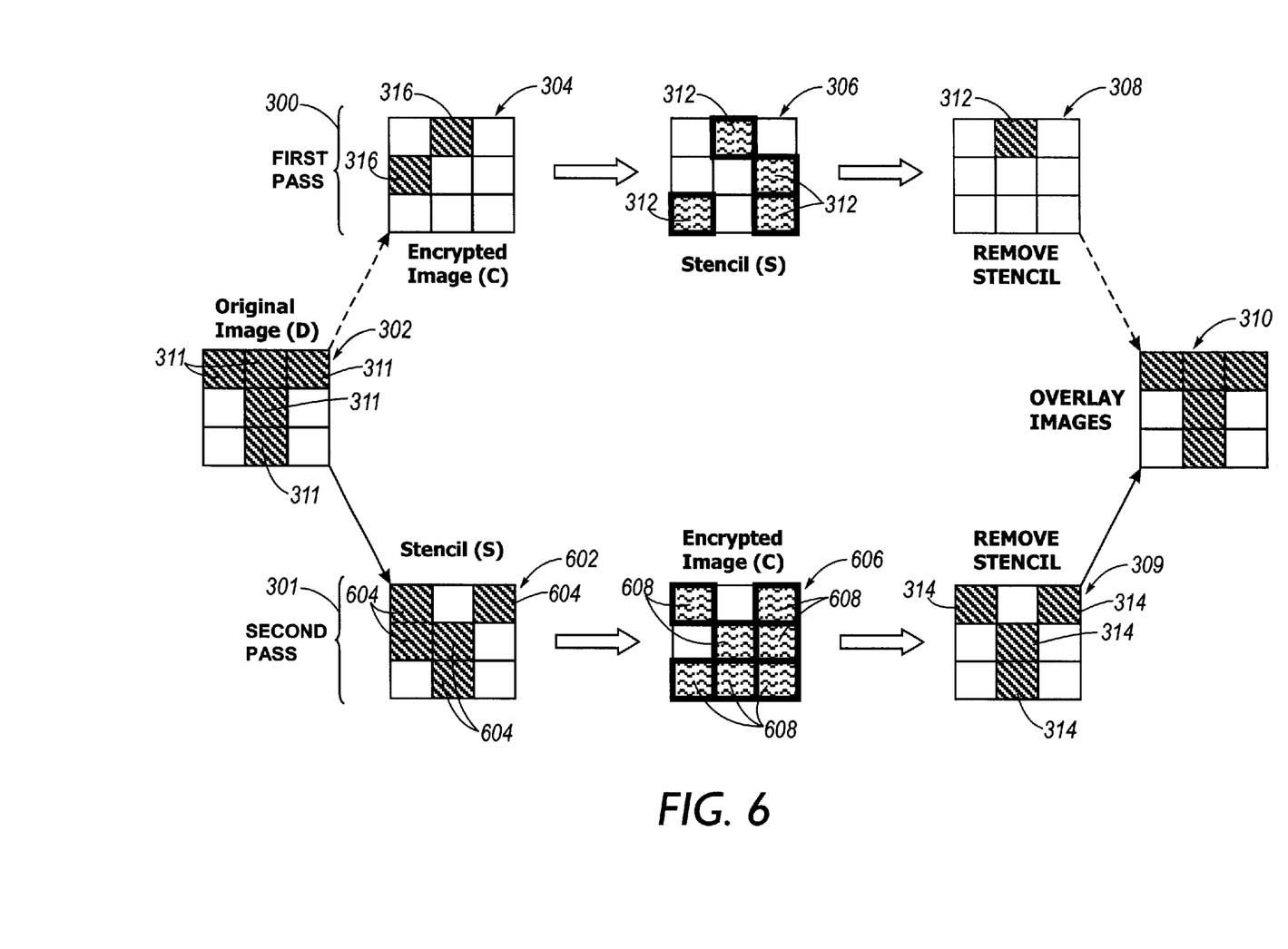
FIG. 6 illustrates yet another alternate embodiment of the present invention where an encrypted image is decrypted by printing the encrypted image through a stencil during a first pass and an image of the stencil through a stencil of the encrypted image during a second pass.

In yet another arrangement of the embodiment shown in FIG. 1, the printer 120 decrypts the encrypted image 104 by printing the encrypted image 104 through the stencil 106 during a first pass and an image of the stencil 106 through a stencil of the encrypted image 104 during a second pass. In this arrangement the roles of the decrypted image and the stencil are reversed during the second pass. For example, FIG. 6 illustrates the example illustrated in FIG. 3 performed according to this embodiment of the invention. Similar to the example shown in FIG. 3, the first pass 300 is identical. However, during the second pass 301, the stencil 306 is represented in as an image 602 (i.e., where a "0" indicates a white pixel and a "1" indicates a black pixel), with black pixels 604, and the encrypted image 304 is represented as a stencil 606 (i.e., here a "0" (i.e., zero) indicates a hole and "1" (i.e., one) indicates a non-hole in the stencil) with holes 608. As illustrated in FIG. 6, the end result of the second pass is the second partially decrypted image 309, which is identical to the image produced using the method shown in FIG. 3. It will be appreciated, however, by those skilled in the art that this arrangement may be secure for some physical implementations of encryption keys but not others.

It will be further appreciated by those skilled in the art that the embodiments described above can be readily adapted to encrypt and decrypt images having a plurality of colors. In addition, it will be appreciated that the two-pass printing or copying operation could be performed by substituting the first recording medium 108 with a transparency, or by swapping the first recording medium 108 with the second recording medium 109. Also, it will be appreciated that there exist a number of variations of the present invention that include: using more than two stencils, passes, and parties, and using various separations of location, time, information, and control.

In yet another embodiment of the invention, the two pass decryption steps are performed using lithography (for background see U.S. Pat. Nos. 4,224,398, 5,952,131, and 5,962,188, which are hereby incorporated by reference). In this alternate embodiment, a receiving member is pretreated to retain marks at certain locations after the stencil (or complement) is washed therefrom. During the first pass in this embodiment, a first receiving member (e.g., first hardcopy document 108) is coated with a washable or non-permanent image of the stencil 106 before rendering the encrypted image 104 thereon. Subsequently, the areas on the first receiving member that are coated with the washable or non-permanent image of the stencil are removed to leave imaged hereon only the portions of the encrypted image 104 that define the first partially decrypted image 122. A similar procedure is performed to define the second partially decrypted image 124.

It will further be appreciated by those skilled in the art that aspects of the present invention may be readily implemented in software using software development environments that provide portable source code that can be used on a variety of hardware platforms. Alternatively, aspects the disclosed system may be implemented partially or fully in hardware using standard logic circuits. Whether software or hardware is used to implement different aspects of the system varies depending on the speed and efficiency requirements of the system and also the particular function and the particular software or hardware systems and the particular microprocessor or computer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for decrypting original image content, comprising the steps of:

printing an encrypted image of the original image content through a stencil to produce a first recording medium with a first partially decrypted image; the stencil blocking portions of the encrypted image from appearing on the first recording medium;

printing a complement of the encrypted image through a complement of the stencil to produce a second recording medium with a second partially decrypted image; the complement of the stencil selectively blocking portions of the complement of the encrypted image from appearing on the second recording medium;

overlaying the first recording medium with the first partially decrypted image on the second recording medium with the second partially decrypted image to fully decrypt the original image content;

fixedly attaching the stencil to the first recording medium before printing the encrypted image of the original image content through the stencil; and detaching the stencil from the first recording medium before performing said overlaying step.

2. The method according to claim 1, further comprising the step of generating the encrypted image as a function of the original document and the stencil.

3. The method according to claim 2, wherein the encrypted image is generated by computing the exclusive-OR of the original document image and an image of the stencil.

4. The method according to claim 1, wherein the first recording medium is a transparency.

5. The method according to claim 4, wherein the second recording medium is paper.

6. The method according to claim 4, wherein the second recording medium is a transparency.

7. The method according to claim 1, wherein said overlaying step is performed by overlaying the second recording medium with the second partially decrypted document on the first recording medium with the first partially decrypted document.

8. A method for decrypting original image content comprising the steps of:

printing an encrypted image of the original image content through a stencil to produce a first recording medium with a first partially decrypted image; the stencil blocking portions of the encrypted image from appearing on the first recording medium;

printing a complement of the encrypted image through a complement of the stencil to produce a second recording medium with a second partially decrypted image; the complement of the stencil selectively blocking portions of the complement of the encrypted image from appearing on the second recording medium;

overlaying the first recording medium with the first partially decrypted image on the second recording medium with the second partially decrypted image to fully decrypt the original image content;

applying a protective coating to the first recording medium; the protective coating representing an image of the stencil; and removing the protective coating after performing said step of printing the encrypted image of the original image content.

9. A method for decrypting original image content, comprising the steps of:

printing an encrypted image of the original image content through a stencil to produce a first recording medium with a first partially decrypted image; the stencil blocking portions of the encrypted image from appearing on the first recording medium;

printing a complement of the encrypted image through a complement of the stencil to produce a second recording medium with a second partially decrypted image; the complement of the stencil selectively blocking portions of the complement of the encrypted image from appearing on the second recording medium; and overlaying the first recording medium with the first partially decrypted image on the second recording medium with the second partially decrypted image to fully decrypt the original image content, wherein the stencil is coated on the first recording medium with a washable coating.

10. A method for decrypting original image content, comprising the steps of:

printing an encrypted image of the original image content through a stencil to produce a recording medium with a first partially decrypted image; the stencil selectively blocking portions of the encrypted image from appearing on the first recording medium; and printing a complement of the encrypted image through a complement of the stencil to produce a second partially decrypted image on the first recording medium; the complement of the stencil selectively blocking portions of the complement of the encrypted image from appearing on the recording medium;

fixedly attaching the stencil to the recording medium before printing the encrypted image of the original image content through the stencil;

wherein said printing steps overlay the second partially decrypted image and the first partially decrypted image on the recording medium to fully decrypt the original image content.

11. The method according to claim 10, further comprising the step of generating the encrypted image as a function of the original document and the stencil.

12. The method according to claim 11, wherein the encrypted image is generated by computing the exclusive-OR of the original document image and an image of the stencil.

13. The method according to claim 10, wherein the second recording medium is paper.

14. The method according to claim 10, further comprising the step of detaching the stencil from the recording medium before attaching the complement of the stencil to the recording medium and printing the complement of the encrypted image through the complement of the stencil.

* * * * *